J. E. PECK.
HOSE MENDING DEVICE.
APPLICATION FILED OCT. 8, 1912.
1,168,222.
Patented Jan. 11, 1916.
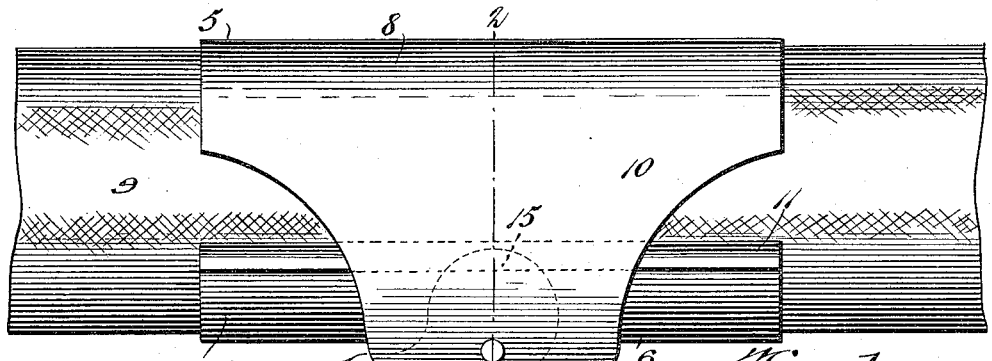
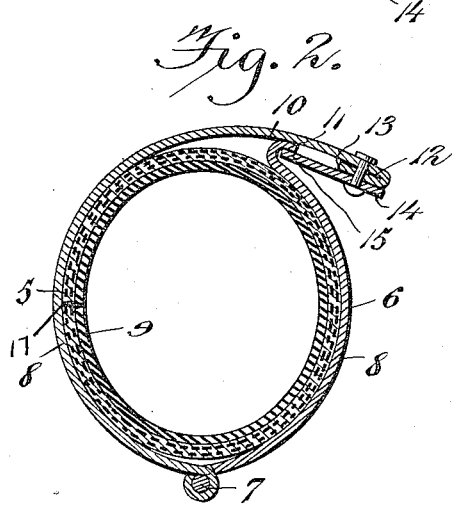
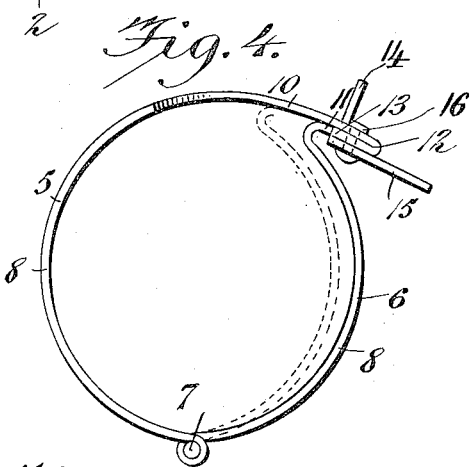
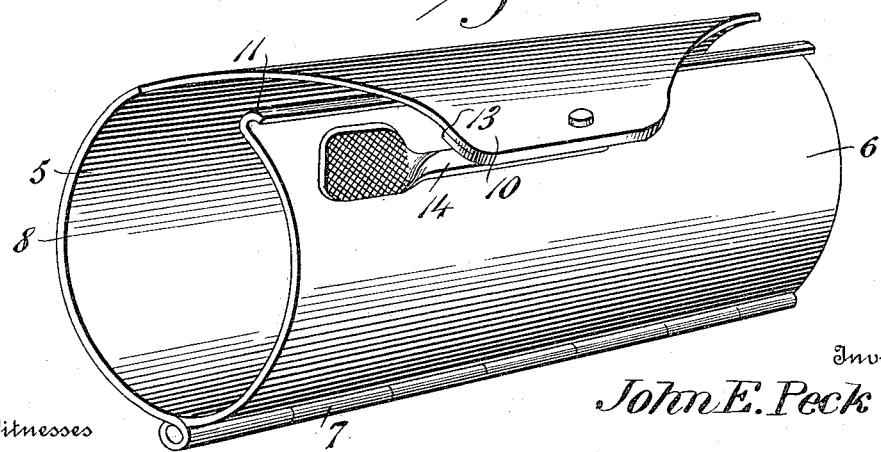
Inventor
John E. Peck
By Victor J. Evans
Attorney

UNITED STATES PATENT OFFICE.

JOHN E. PECK, OF LOGAN, WEST VIRGINIA.

HOSE-MENDING DEVICE.

1,168,222.

Specification of Letters Patent.

Patented Jan. 11, 1916.

Application filed October 8, 1912. Serial No. 724,534.

*To all whom it may concern:*

Be it known that I, JOHN E. PECK, a citizen of the United States, residing at Logan, in the county of Logan and State of West Virginia, have invented new and useful Improvements in Hose-Mending Devices, of which the following is a specification.

The invention relates to a hose mender and more particularly to the class of hose clamps.

The primary object of the invention is the provision of a clamp of this character wherein the same can be readily and quickly applied by one of the hands of an operator to a hose should the same burst or become punctured at any point thereof, thereby mending the same to avoid leakage at the break therein during the use of the hose.

Another object of the invention is the provision of a device of this character in which a hose or pipe may be readily clamped at the point of fracture or break therein so as to avoid leakage, the device being securely clamped in proper position so as to reinforce the hose at the point of break therein.

A further object of the invention is the provision of a device of this character in which the swinging sections thereof are of a shape so as to compress a hose at the point of fracture or break therein so as to close the latter, thereby avoiding a leakage so as to render it fit for further service.

A still further object of the invention is the provision of a device of this character which is extremely simple in construction, strong, durable and inexpensive in manufacture, also light in weight, speedy and simple in operation.

With these and other objects in view the invention consists in the construction, combination and arrangement of parts as will be hereinafter more fully described, illustrated in the accompanying drawings and pointed out in the claim hereunto appended.

In the drawings, Figure 1 is a top plan view of a hose clamp constructed in accordance with the invention applied to a hose. Fig. 2 is a sectional view on the line 2—2 of Fig. 1. Fig. 3 is a perspective view of the clamp removed from the hose. Fig. 4 is an end elevation of the clamp prior to the fastening thereof.

Similar reference characters indicate corresponding parts throughout the several views of the drawings.

Referring to the drawings by numerals the clamp comprises a two-part sleeve, the parts or sections 5 and 6 respectively thereof being connected together at adjacent edges by means of a hinge 7 whereby the same may be swung to open or closed position. Each part or section is outwardly curved at 8 so that when the parts 5 and 6 are engaged about a hose 9 they will compress the latter for the mending of a fracture or break therein on the clamping of the said parts 5 and 6 together in a manner presently described.

By reason of the curvatures 8 in the parts 5 and 6 the same when brought into clamping relation to each other will assume the conformation of an oval in contradistinction to a circular form, thus contracting the hose 9 for the closing of the break or puncture which may be present therein.

The section 5 at its free edge is formed with a resilient extension or tongue 10 while the section 6 is formed at its free edge with an upwardly and outwardly curved locking flange 11, the extension or tongue 10 being formed on its inner side with a rib 12 providing an abutment shoulder 13 adapted to be engaged by the flange 11 on the bringing of the parts or sections 5 and 6 together or in clamping relation to each other so that the sleeve can be clipped about the hose 9 by one of the hands of the operator without the liability of the parts 5 and 6 thus swinging to open position after external pressure has been applied thereto and the same have been brought to the position shown in Fig. 4 of the drawings. Mounted upon the rib 12 of the tongue 10 is a cam lever 14 the cam portion 15 of which being eccentrically connected to the rib by means of a pivot 16 so that on the closing of the parts or sections 5 and 6 the cam portion 15 can be brought into engagement with the locking flange 11 and thereafter on swinging the said lever 14 in one direction the sleeve can be securely fastened about the hose 9 which has burst or become broken as indicated at 17, the sleeve being designed to act upon the hose 9 to close the break therein, it being understood of course that the sleeve is positioned on the hose 9 at the point of break so that one of the parts 5 or 6 will overlie the break. The parts 5 and 6 when surrounding the hose 15 and clamped in closed position will mend the break and thereby avoid leakage while the hose 9 is in use.

From the foregoing description taken in connection with the accompanying drawings it is thought that the construction and operation of the invention will be clearly understood, and therefore more extended explanation has been omitted.

What is claimed is:—

A hose mending device comprising hinged arcuate sections, one of which is resilient, one of said sections having a hook flange on its free edge, the other section having a rigidly attached longitudinal tongue, and a cam carried by said tongue and arranged to engage the flange.

In testimony whereof I affix my signature in presence of two witnesses.

JOHN E. PECK.

Witnesses:
E. EDMONSTON, Jr.,
FRANK O. PARKER.

Copies of this patent may be obtained for five cents each, by addressing the "Commissioner of Patents, Washington, D. C."